J. S. MAXWELL.
SAFETY VALVE.
APPLICATION FILED OCT. 7, 1918.

1,293,156.

Patented Feb. 4, 1919.

Inventor
John S. Maxwell
By Kerr Page Cooper & Hayward
Attorneys

UNITED STATES PATENT OFFICE.

JOHN S. MAXWELL, OF RICHMOND, INDIANA, ASSIGNOR TO THE STARR PIANO COMPANY, OF RICHMOND, INDIANA, A CORPORATION OF INDIANA.

SAFETY-VALVE.

1,293,156.   Specification of Letters Patent.   Patented Feb. 4, 1919.

Application filed October 7, 1918. Serial No. 257,228.

*To all whom it may concern:*

Be it known that I, JOHN S. MAXWELL, a citizen of the United States, residing at Richmond, in the county of Wayne and State of Indiana, have invented certain new and useful Improvements in Safety-Valves, of which the following is a full, clear, and exact description.

The invention which constitutes the subject matter of this application relates to improvements in safety valves particularly those which are employed in connection with balloons used for army observation purposes. I have found, in the practical operation of the ordinary form of these valves, that considerable difficulty is encountered, when the balloon is not in actual use, in maintaining the valve sufficiently tight upon its seat to prevent the escape of the inclosed gases. I have also found that no provision is made to enable the valve to be adjusted to render it responsive to any desired pressure.

To overcome the first mentioned difficulty I provide means by which the valve, under normal conditions, may be seated fluid tight and for locking said valve in such fluid tight relation to its seat. And to overcome the second mentioned difficulty I provide means whereby the tension means, which maintains the valve normally upon its seat, may be varied thereby enabling the gases to escape at any predetermined or desired pressure.

Figure 1:
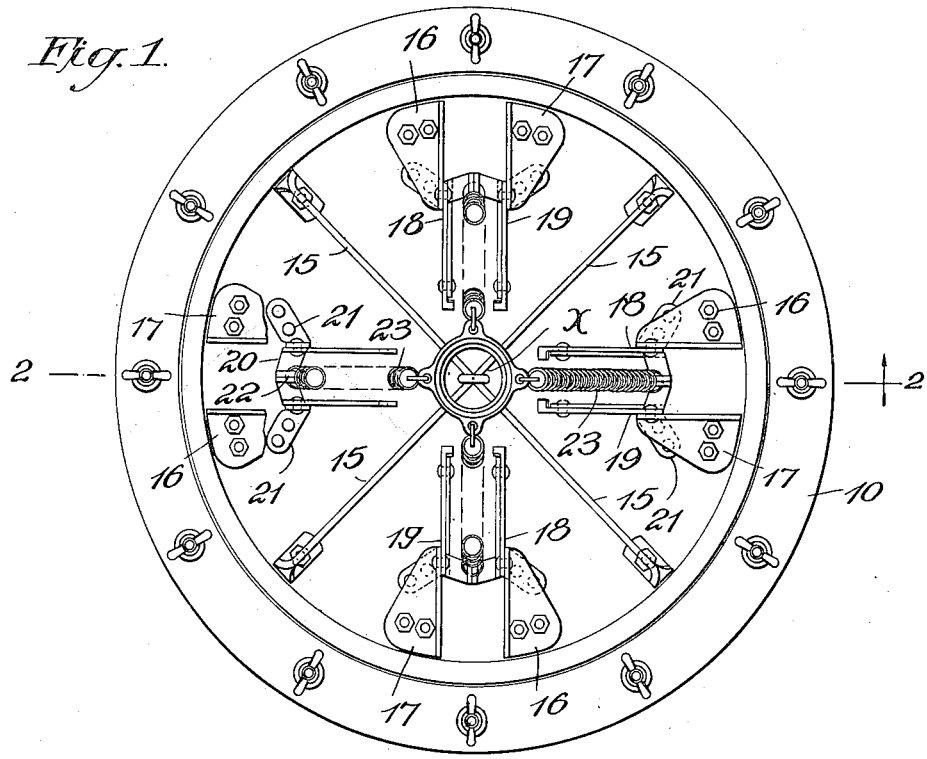
Figure 2:
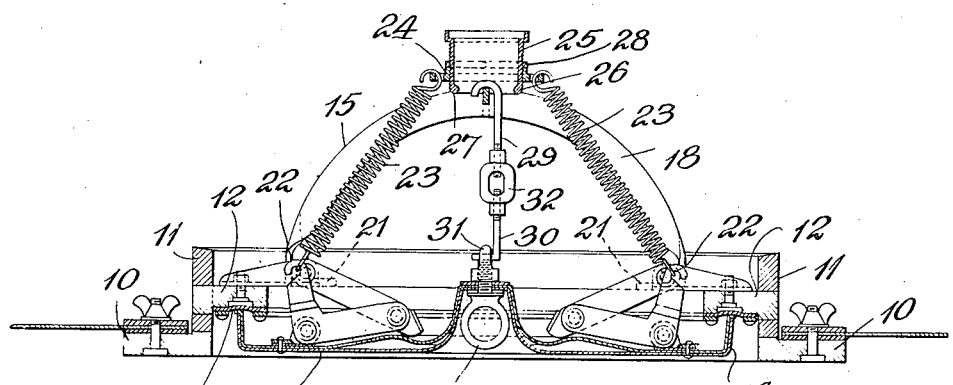

Other objects and advantages of my invention will appear from the detailed description below taken in connection with the accompanying drawing in which Figure 1 is a top plan view of the valve, and Fig. 2 is a section taken on the line 2—2 of Fig. 1.

Referring to the drawing in detail, which illustrates the preferred embodiment of my invention, the reference numeral 10 designates a base secured in any convenient fashion to the walls of the balloon. Secured to the base 10 is an outwardly projecting annular frame 11 provided with a laterally projecting annular flange 12.

On the inner side of the lateral flange 12 there is provided an annular valve seat or gasket 13 of flexible material to enable the valve 14 to seat fluid tight thereon. To the frame 11 and annular flange 12 there are secured a plurality of quadrant arms 15 the outer ends of which terminate at a single point X forming in effect a spider.

The valve 14 is held normally against its seat 13 by means of the following mechanism: To the lateral flange 12 there are secured double brackets or fulcrum plates 16—17, preferably four in number. To each of these double brackets there is pivotally connected one of the ends of each of two links 18—19 the other ends of which are pivotally connected to one arm of a bell crank lever 20. The intermediate portions of the bell crank levers are pivotally connected to brackets or lugs 21 fixed to the valve 15 and the other arms of which are provided with eyes 22 adapted to be engaged by one of the ends of springs 23. The other ends of each of these springs are connected to an adjustable collar 24 provided with internal screw threads adapted to engage external screw threads on the adjusting sleeve 25 the latter being provided with a beaded lower end 26 normally resting in notches 27 provided in the spider 15. The function of the links 18—19, bell crank levers 20—21, and their respective connections, as will be understood, is to control the proper direction of the opening and closing movements of the valve 14, while the springs 23 serve to close the valve and to maintain the same in its normally closed position. From the foregoing it will be seen that by moving the collar 24 inwardly or outwardly by means of the adjusting sleeve 25, the tension of the springs is decreased or increased, thereby enabling the gases to escape from the balloon at any desired pressure. In order to prevent any accidental movement of the adjustable collar 24 relative to sleeve 25 an ordinary lock nut 28 may be employed to lock the same in its adjusted position.

The means, as illustrated in the accompanying drawing for locking the valve in fluid tight relation to its seat when the balloon is not in use, comprises a member 29 engaging over the point X of the spider and a member 30 engaging the eye 31 on the valve 14, said members being provided with a turn buckle 32 screw threaded thereto for moving the same toward and away from each other. It will therefore be apparent that when the turn buckle is "tightened" it will draw the valve firmly against its sea' thereby preventing the loss of any gases when the balloon remains idle for any length of time.

The inner side of the valve 14 is provided with an eye bolt or other attaching means 33 for a cord not shown. In fact no part of the balloon proper is illustrated as the use and adaptation of my invention will be clearly apparent to those skilled in this art.

What I claim is:

1. A safety valve for observation balloons, comprising a base member provided with a valve seat thereon, a valve movable toward and away from said seat, a spider connected to said base, an adjusting sleeve normally resting upon said spider, a collar screw threaded to and adjustable by means of said sleeve, and resilient means connected to said adjustable collar and to said valve for closing the latter and for maintaining the same against its seat.

2. A safety valve for observation balloons, comprising a base member provided with a valve seat thereon, a valve movable toward and away from said seat, a spider connected to said base, a sleeve normally resting upon said spider, and a resilient means connected to said sleeve and to said valve for closing the latter and for maintaining the same in normal position against its seat, the connection between said sleeve and resilient means comprising a member adjustable from and toward said valve to increase and decrease the tension of said resilient means.

3. In a safety valve for observation balloons, a base member provided with a valve seat thereon, a valve for said seat, means pivotally connected to said valve and to said base member for controlling the direction of movement of said valve toward and away from its seat, in combination with means for closing said valve and for normally maintaining the same upon its seat, comprising arms supported by said base, and a resilient means connected on the one hand to said controlling means and anchored on the other hand to said supporting arms, the connection between the latter and said resilient means being adjustable to vary the tension of the resilient means.

4. A safety valve for observation balloons, comprising a base member provided with an inwardly facing valve seat thereon, a valve movable toward and away from said seat, a spider connected to said base, an adjusting sleeve normally resting upon said spider, a collar screw-threaded to and adjustable by means of said sleeve, and resilient means connected to said adjustable collar and to said valve for closing the latter and for maintaining the same against its seat, the said adjusting sleeve being held in its normal position upon the spider by means of said resilient means.

5. A safety valve for observation balloons, comprising a base member provided with an inwardly facing valve seat thereon, a valve movable toward and away from said seat, a spider connected to said base, a sleeve normally resting upon said spider, and a resilient means connected to said sleeve and to said valve for closing the latter and for maintaining the same in normal position against its seat, the connection between said sleeve and resilient means comprising a member adjustable from and toward said valve to increase and decrease the tension of said resilient means, the said adjusting sleeve being held in its normal position upon the spider by means of said resilient means.

6. In a safety valve for observation balloons, a base member provided with an inwardly facing valve seat thereon, a valve for said seat, means for controlling the direction of movement of said valve toward and away from its seat, in combination with means for closing said valve and for normally maintaining the same upon its seat comprising a spider supported by said base, a threaded sleeve rotatably supported upon said spider and provided with a collar movable inwardly and outwardly by the rotation of said sleeve, and resilient means anchored to said collar and connected to said controlling means, the said adjusting sleeve being held in its normal position upon the spider by means of said resilient means.

7. In a safety valve for observation balloons, a base member provided with a valve seat thereon, a valve for said seat, means pivotally connected to said valve and to said base member for controlling the direction of movement of said valve toward and away from its seat, in combination with means for closing said valve and for normally maintaining the same upon its seat comprising a spider supported by said base and provided with arcuate notches on the outer side thereof, a threaded sleeve rotatably supported in said notches and provided with a collar movable inwardly and outwardly by the rotation of said sleeve, and resilient means anchored to said collar and connected to said controlling means for maintaining the latter in normal position against its seat.

8. A construction as set forth in claim 7 in combination with means for effecting a fluid tight connection between the valve and its seat and for locking the former against the latter comprising a member engaging the spider, a second member for engaging the valve, and a turn buckle arrangement for drawing said members toward each other.

9. In a safety valve for observation balloons, a base member provided with a valve seat thereon, a valve for said seat, means for controlling the direction of movement of said valve toward and away from its seat, in combination with means for closing said valve and for normally maintaining the same upon its seat comprising a spider supported by said base, a threaded sleeve rotatably supported upon said spider and provided with a collar movable inwardly and outwardly by the rotation of said sleeve, and resilient means anchored to said collar and connected to said controlling means.

10. A safety valve for observation balloons, comprising a base member provided with an inwardly facing valve seat thereon, a valve movable toward and away from said seat, a spider connected to said base and resilient means for closing the valve and maintaining the same against its seat, in combination with means coöperating with said valve and spider for effecting a fluid tight connection between the valve and its seat and for locking the former against the latter.

11. A safety valve for observation balloons, comprising a base member provided with an inwardly facing valve seat thereon, a valve movable toward and away from said seat, a spider connected to said base and resilient means for closing the valve and maintaining the same against its seat, in combination with means for effecting a fluid tight connection between the valve and its seat and locking the former against the latter comprising a member engaging the spider, a second member for engaging the valve, and a turn buckle for drawing said members toward each other.

In testimony whereof I affix my signature.

JOHN S. MAXWELL.